US008032113B2

(12) United States Patent
Bailey et al.

(10) Patent No.: US 8,032,113 B2
(45) Date of Patent: Oct. 4, 2011

(54) VALUE ADDED TRANSACTION GATEWAY FOR VIDEO CLIPS

(75) Inventors: Kenneth S. Bailey, Newport Beach, CA (US); Christopher Carmichael, Laguna Beach, CA (US)

(73) Assignee: Ubiquity Holdings, Inc, Irvine, CA (US)

( * ) Notice: Subject to any disclaimer, the term of this patent is extended or adjusted under 35 U.S.C. 154(b) by 717 days.

(21) Appl. No.: 11/874,879

(22) Filed: Oct. 18, 2007

(65) Prior Publication Data

US 2008/0182550 A1    Jul. 31, 2008

Related U.S. Application Data

(60) Provisional application No. 60/853,645, filed on Oct. 21, 2006.

(51) Int. Cl.
*H04W 88/02*     (2009.01)
(52) U.S. Cl. ........................................... 455/406
(58) Field of Classification Search .............. 455/3.06, 455/406, 411, 424, 436, 457, 557, 556.1; 386/124; 726/26; 709/217, 219; 707/781
See application file for complete search history.

(56) References Cited

U.S. PATENT DOCUMENTS

| | | | |
|---|---|---|---|
| 7,756,892 B2 * | 7/2010 | Levy ............................. 707/781 |
| 7,800,646 B2 * | 9/2010 | Martin .......................... 348/157 |
| 2002/0022885 A1 * | 2/2002 | Ochi ........................ 623/16.11 |
| 2004/0259633 A1 * | 12/2004 | Gentles et al. .................. 463/29 |
| 2004/0266533 A1 * | 12/2004 | Gentles et al. .................. 463/42 |
| 2006/0035707 A1 * | 2/2006 | Nguyen et al. ................. 463/29 |
| 2006/0206582 A1 * | 9/2006 | Finn .............................. 709/217 |
| 2006/0270386 A1 * | 11/2006 | Yu et al. ........................ 455/406 |
| 2007/0073717 A1 * | 3/2007 | Ramer et al. .................... 707/10 |
| 2007/0073722 A1 * | 3/2007 | Ramer et al. .................... 707/10 |
| 2007/0198432 A1 * | 8/2007 | Pitroda et al. ................... 705/64 |
| 2008/0052783 A1 * | 2/2008 | Levy .............................. 726/26 |
| 2008/0097632 A1 * | 4/2008 | Logan ............................. 700/94 |
| 2008/0161111 A1 * | 7/2008 | Schuman ........................ 463/41 |
| 2008/0177864 A1 * | 7/2008 | Minborg et al. ............. 709/219 |
| 2008/0214155 A1 * | 9/2008 | Ramer et al. ............. 455/414.1 |
| 2008/0293486 A1 * | 11/2008 | Newcombe ..................... 463/29 |
| 2009/0131141 A1 * | 5/2009 | Walker et al. ................... 463/17 |
| 2009/0249222 A1 * | 10/2009 | Schmidt et al. ............... 715/751 |
| 2009/0265737 A1 * | 10/2009 | Issa et al. ......................... 725/38 |
| 2009/0271855 A1 * | 10/2009 | Buzzard ........................... 726/9 |
| 2009/0327057 A1 * | 12/2009 | Redlich ...................... 705/14.2 |
| 2010/0070717 A1 * | 3/2010 | Arimilli et al. ............... 711/141 |
| 2010/0088170 A1 * | 4/2010 | Glore, Jr. ................... 705/14.19 |

* cited by examiner

*Primary Examiner* — Diane Mizrahi

(74) *Attorney, Agent, or Firm* — Law Office of Scott C. Harris, Inc.

(57) ABSTRACT

Users are allowed to download information from a cellular network, but are charged for the download. A part of the charge for the download goes to the creator of the information and download. A device determines how many downloads each user-created item has received. Also, a list is provided which displays to other users which are the most commonly downloaded elements.

6 Claims, 2 Drawing Sheets

VALUE ADDED TRANSACTION GATEWAY FOR VIDEO CLIPS

The present application claims priority from provisional application No. 60/853,645, filed Oct. 21, 2006, the contents of which are herewith incorporated by reference.

BACKGROUND

Cellular phones are now used for purposes well beyond their original intended purpose of simple communication. Mobile phones are often used in place of digital cameras to obtain photos. Many believe that more photos are taken with mobile phones than with digital cameras.

Gaming over a cellular network is also possible, for example social gaming over a cell phone network. Gaming over the cell phone network may increase the demand for cellular telecommunications services, and may also create an entirely new market, for example, for cellular gaming devices that operate over cellular networks.

At present, cellular phones often come equipped with simplistic games that can be played over the cellular telephone. However, improved hardware such as improved processes and display capabilities, as well as improved software, may make playing the games over cellular networks more interesting.

The cellular carriers typically are very interested in anything done over the cellular network that increases their revenue.

SUMMARY

The present application describes a special way of using a cellular network to encourage use of the cellular network.

DETAILED DESCRIPTION

The present inventors noted that cellular providers might be able to make more income if they provided incentives for use of the cellular network. Game use over the cellular network might be one way to obtain more use. However, since the games that are typically packaged with a cellular phone are free, it is believed that there would be significant resistance from consumers if one were to attempt to charge for playing other games over the mobile network.

The present application describes a technique whereby people are incentivized by a revenue participation model.

Figure 1:
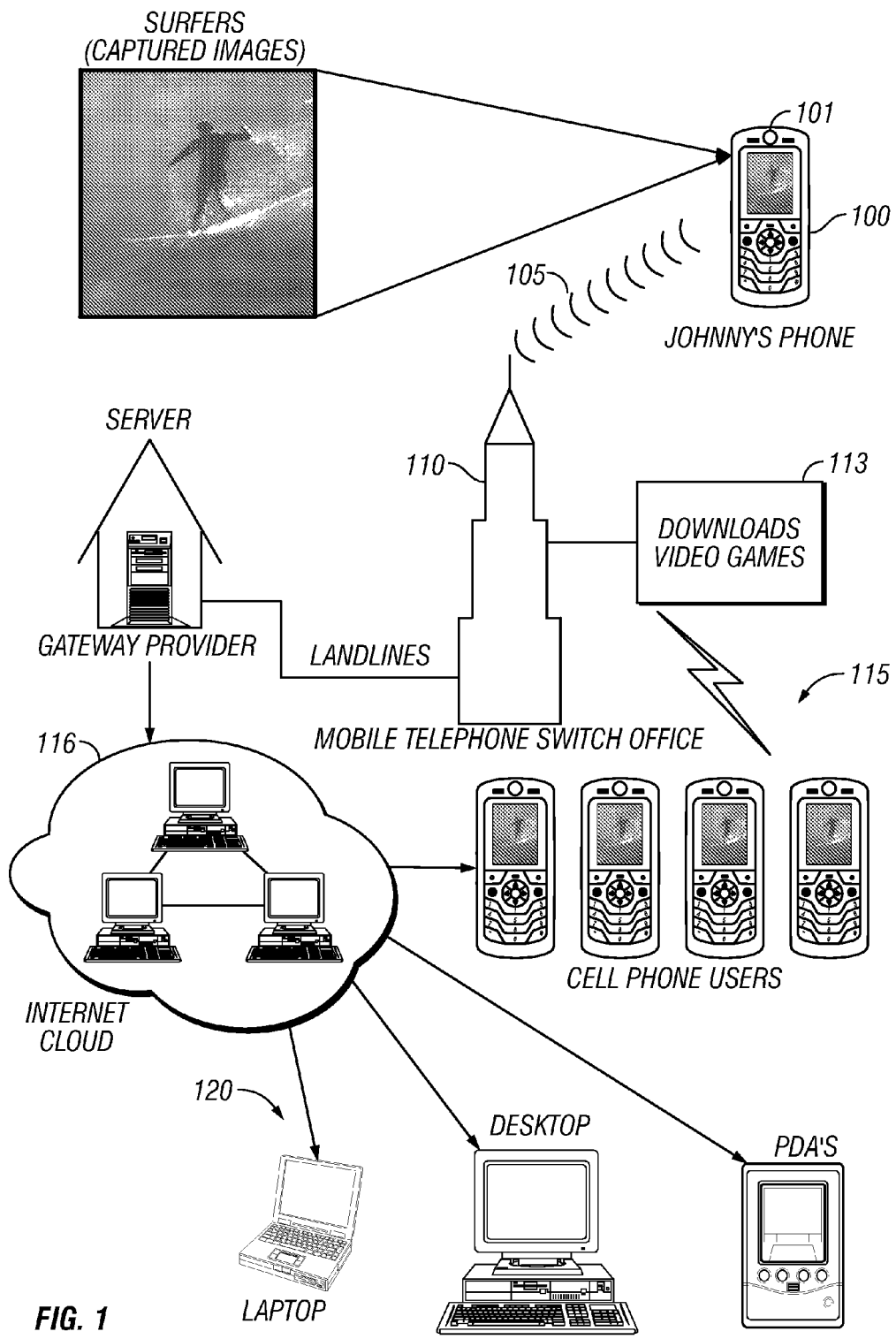
FIG. 1 shows a connection between various parts on the internet and cell phone.

According to an embodiment shown in FIG. 1, an owner of a cellular phone 100 produces a video or takes a picture, or makes a game to be played by others, using their mobile phone. In the embodiment, the video/image/game is sent wirelessly over 105 to the switching office 110, from which it can be downloaded by other cell phone users 115, or laptop/desktop etc users 120. The mobile network may produce a "downloads" screen 113, which shows and arranges the items that can be downloaded. For example, this may include videos and games, and further detail within each of those items that is selected.

The owner receives a reward, e.g. money, credit, promotional items, or the like for successful production. One embodiment uses the built-in video camera 101 that is part of a cellular phone 100 or other portable handheld device. This allows phone owners, e.g., teenagers and other mobile phone owners, to create their own content driven videos. The teenagers can edit clips that they receive or make, and publish those clips on the Internet 116 or over a special network over the mobile phones.

Figure 2:
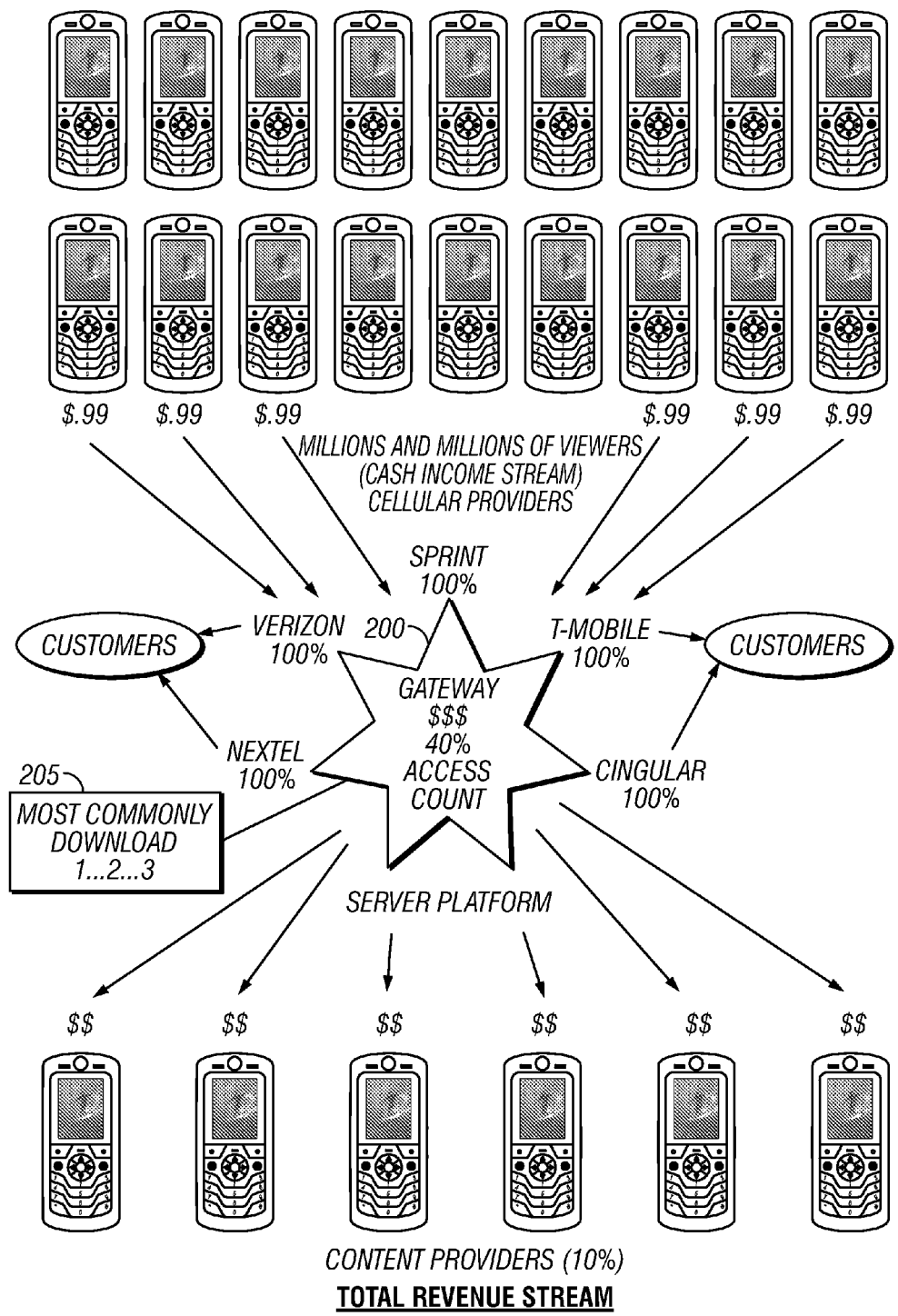
FIG. 2 illustrates the flow of the revenue sharing according to the present application.

FIG. 2 illustrates the revenue stream. Each time someone views the clip that is created, the author receives some kind of reward. The reward is received from either the host Internet platform provider, from the cellular provider, or from an advertiser, for example. For example, cellular network providers such as Sprint or T-Mobile may charge subscribers to send and receive videos, still pictures, or download games. At present, the cellular provider charges $0.99 to send or receive video clips, and between $1.99 and $6.99 to download video games which can be played on the cell phone or PDA.

The present system can be used in connection with a cellular provider who receives payment for the use of the cellular network. Once so paid, the provider compensates the originator of the content so downloaded, as a bonus for the originator causing the cellular network to be used in this way. In this way, the cellular provider provides rewards for those users who create interesting content that is used by other users of the cellular provider. It encourages users to make content that can be used over the cellular network, and hence encourages those users to use the cellular network. Moreover, it encourages users to create content that they think will be popular, since such creation ends up getting them some monetary rewards.

Take an example of a teenager named Johnny who captures a 30 second clip of someone surfing a big wave in Hawaii. The teenager can then send that clip via the cellular phone to the Internet gateway provider who broadcasts the clip from their website via the Internet. Each time that clip is downloaded, the individual may be billed some amount, for example $0.99. Some portion of that billed fee goes to Johnny, for example in this embodiment, Johnny may receive $0.10 each time the cellular clip is downloaded.

Users are hence rewarded for making popular clips. For example in the embodiment above, if 10,000 teenagers download the surfing clip, then Johnny will make $1000 in cash, prizes or cash equivalents. The cellular provider also collects 89 cents each time the clip is downloaded, hence also making substantial income from this operation.

An Internet access counter 200 keeps track of the number of viewers of a clip. This allows telling and compensating the clip provider, so that the clip provider can understand how many people have actually viewed, and are actually viewing, the clip. In addition, moreover, while the above has described the clip producer receiving cash rewards, it should be understood that the producer can alternatively receive other kinds of rewards, such as free services, discounts, or the like.

Another embodiment shows the most commonly downloaded items as 205. For example, these most commonly downloaded items may be the most commonly downloaded videos or games. Human nature may dictate that people would prefer now to download more popular items, so these most popular items are preferentially shown to the users.

Other embodiments may allow posting artistic style photos that can be shared, or games that can be shared. For example, a user may obtain a software development kit for games, and make games that are played on the portable device. The games are then downloadable, and can be played on the portable devices.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other items can be downloadable in this way.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method, comprising:
   on a computer that is connected to the internet, accepting items from contributing users for presentation over a cellular network, where said items are videos or pictures created by the contributing users using a camera to take a video or picture of at least one person;
   providing an indication to at least plural other users that said items which have been received from said contributing users are available for download over the cellular network;
   using the computer for allowing any of said plural other users to download any of said items over the cellular network; and
   responsive to said another user downloading said at least one item, billing said another user by a billing amount and using said computer for paying a specified portion of said billing amount to the cellular network, and paying another specified portion of said billing amount to the user that produced the item that was downloaded.

2. A method as in claim 1, wherein said at least one item is a video or picture of another person other than the contributing user.

3. A method as in claim 1, wherein video or picture is taken using a camera cell phone.

4. A method comprising:
   Using a programmed computer for allowing a downloading user to download user-uploaded items, over a cellular network, where said user uploaded items are videos or pictures created by the contributing users using a camera to take a video or picture of at least one person;
   Using the computer for charging the downloading user a fee for said downloading; and
   Using the computer providing a portion of the fee to a creator of the user-uploaded items, and another portion of the fee to an operator of the cellular network.

5. A method as in claim 4, wherein the user uploaded items include a video or picture of another person other than the contributing user.

6. A method as in claim 4, wherein the user uploaded items include a video or picture is taken using a camera cell phone.

* * * * *